United States Patent [19]

Brassfield et al.

[11] Patent Number: 4,743,908
[45] Date of Patent: May 10, 1988

[54] TARGET POSITION RADAR

[75] Inventors: John R. Brassfield, Prairie Village; Roger A. Jones, Iola; Edward W. Sergent; Joseph C. Winkler, both of Chanute, all of Kans.

[73] Assignee: M. P. H. Industries, Inc., Chanute, Kans.

[21] Appl. No.: 794,787

[22] Filed: Nov. 4, 1985

[51] Int. Cl.$^4$ .............................................. G01S 9/02
[52] U.S. Cl. .................................................. 342/113
[58] Field of Search ............... 342/418, 147, 113, 117, 342/66, 104, 105

[56] References Cited

U.S. PATENT DOCUMENTS

| | | |
|---|---|---|
| 3,438,031 | 4/1969 | Fathauer . |
| 3,689,921 | 9/1972 | Berry . |
| 3,936,824 | 2/1976 | Aker et al. . |
| 4,110,754 | 8/1978 | Endó .................................. 342/147 |
| 4,214,243 | 7/1980 | Patterson . |
| 4,293,859 | 10/1981 | Sergent . |

Primary Examiner—Thomas H. Tarcza
Assistant Examiner—Donald E. Hayes, Jr.
Attorney, Agent, or Firm—D. A. N. Chase

[57] ABSTRACT

A traffic radar unit capable of looking past the lead vehicle of oncoming traffic and discovering and identifying a violator employs master and slave antennas having diverging boresights that provide overlapping relative power density radiation patterns. The radar return signal from a target of interest is received by each antenna to produce two independent Doppler signals of the same frequency which are processed by respective master and slave signal processing channels. In the illustrated embodiment, a reference boresight is established in the overlapped patterns such that a target position along the reference boresight occurs at the time that the amplitudes of the two Doppler signals are equal. Controllable high pass filters whose passbands are shifted upwardly in response to return signals of increasing amplitude attenuate stronger, lower frequency interfering signals. The presence of a second Doppler signal in either channel having a frequency near the signal of interest causes the receiver to abort the tracking mode.

15 Claims, 3 Drawing Sheets

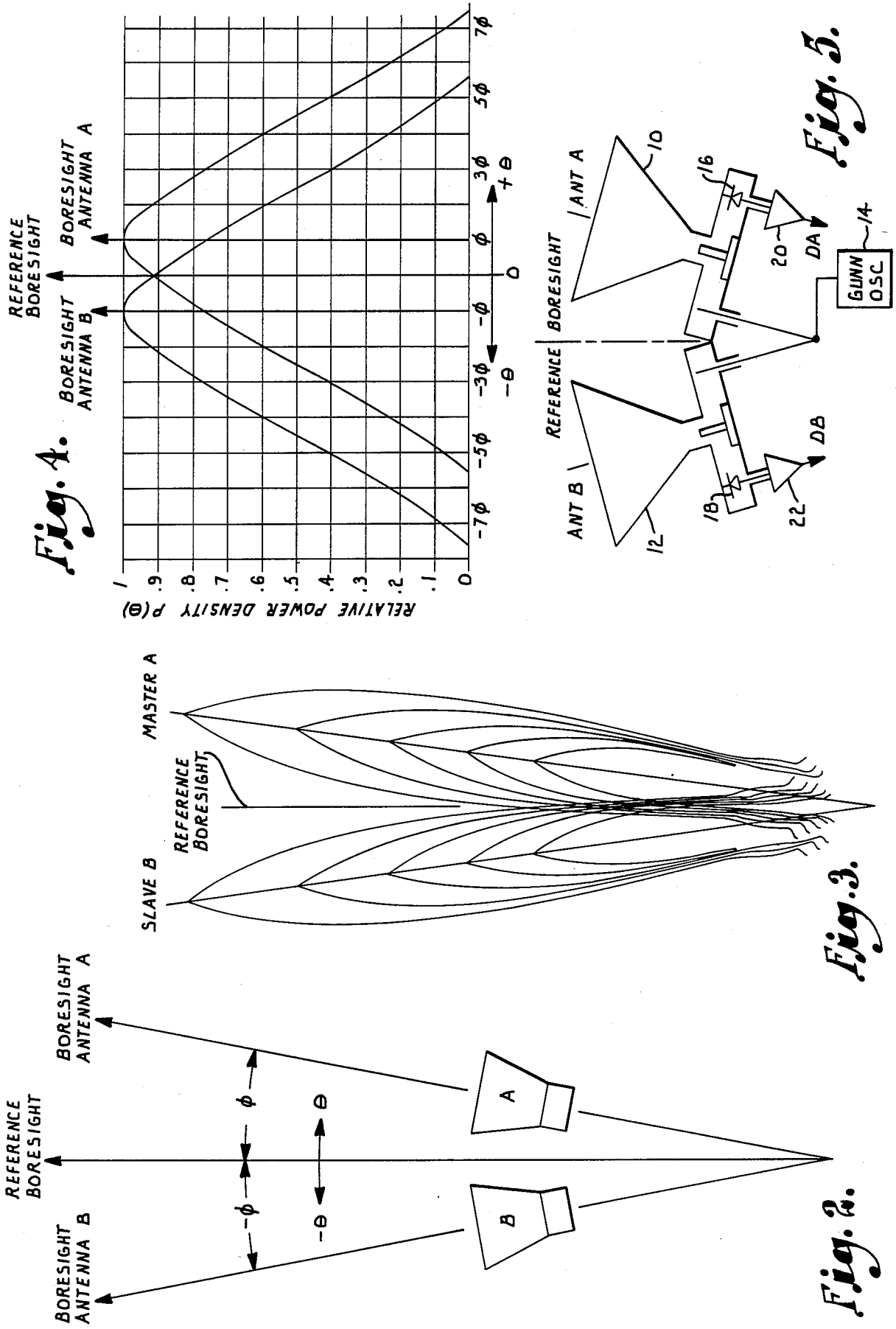

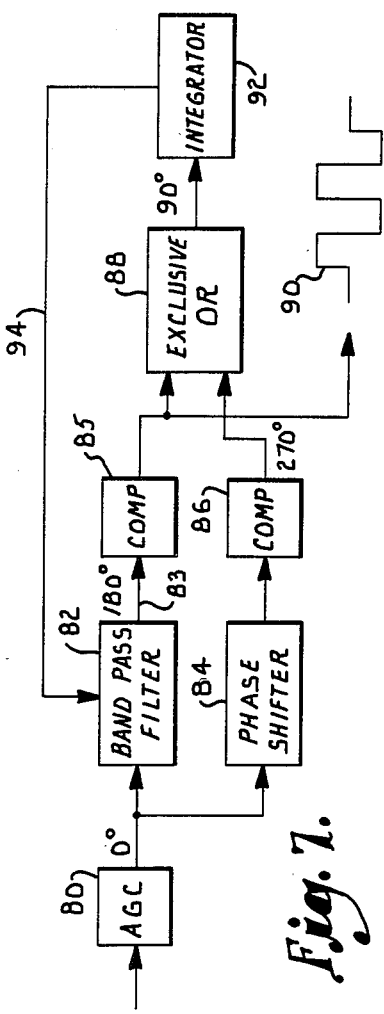
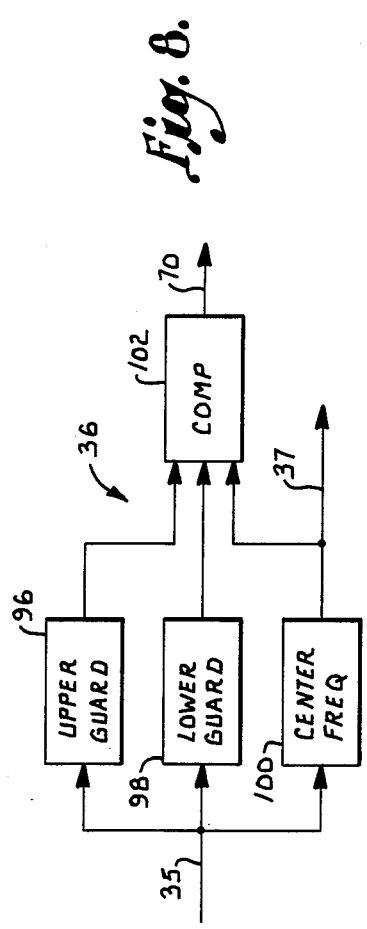
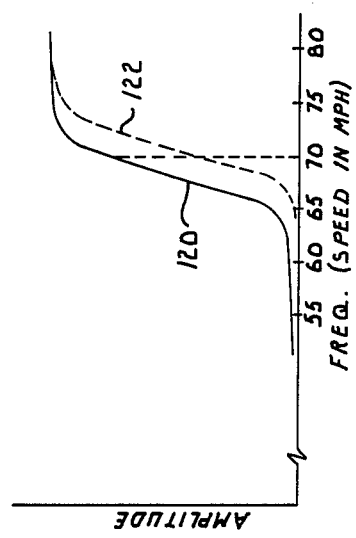
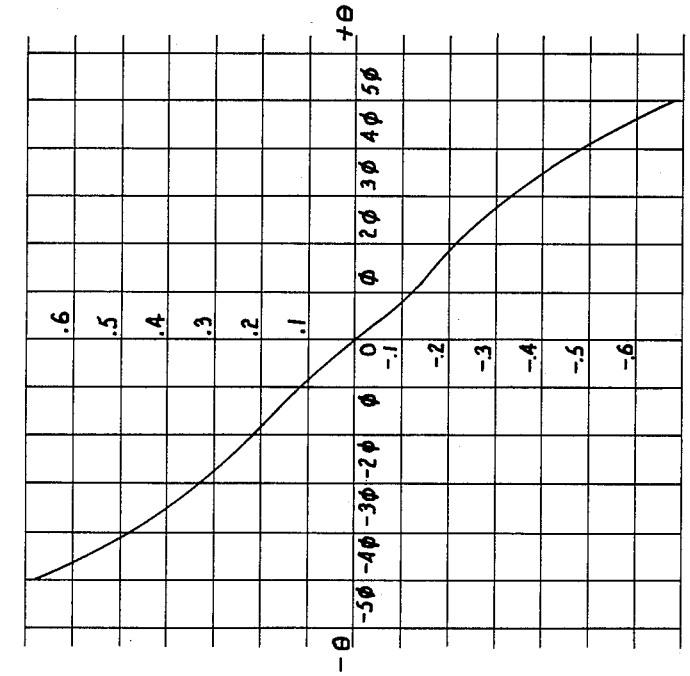
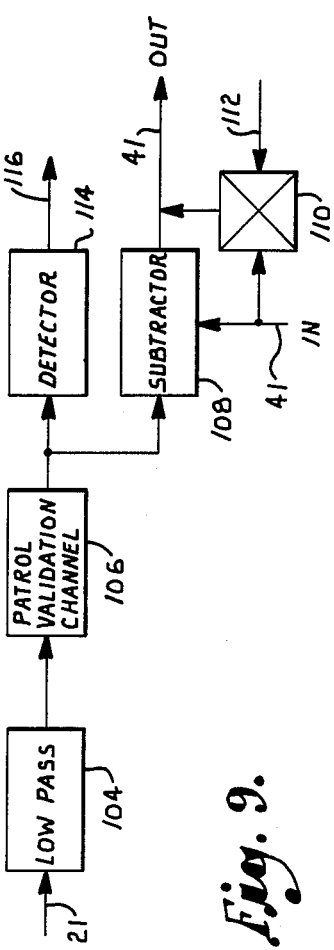

TARGET POSITION RADAR

This invention relates to improvements in radar systems where it is desired to determine the position of a moving target that may be one of a number of targets moving at different speeds and, in particular, to an improved Doppler radar for use in traffic control applications which is capable of discovering and identifying a high-speed vehicle behind the lead vehicle in a line of traffic.

The application of radar to traffic control and vehicle speed determination has enjoyed widespread use by law enforcement agencies and employs Doppler radar principles in the determination of the speed of an oncoming vehicle thought to be an offender. It is presently a requisite for an arrest that the target vehicle be out front, by itself, nearest the radar speed detector. This limits the patrolman's inquiry to the lead vehicle of an oncoming line of traffic, and is a result of the inability of existing traffic radars to reliably discriminate among several oncoming targets spaced successively greater distances from the radar antenna. This has been dictated by square law considerations in that the strength of a radar return signal or echo is inversely proportional to the fourth power of the distance of the target from the antenna, assuming targets of the same reflected area. Accordingly, a target such as an automobile half the distance from the antenna as another target of the same character returns a signal 16 times stronger than the distant target. For this reason, typical traffic radar units in use at the present time tend to "see" only the closest target vehicle and thus their use is limited to acquisition and speed determination of that target only.

Furthermore, current design practice is to provide a traffic radar with nearly flat response to targets of varying velocity, i.e., the radar has the same response to vehicles of like size at the same distance regardless of speed. This flat response characteristic prevents the radar from "looking past" a slow-moving, lead target vehicle to discover and identify a higher speed trailing vehicle, thus preventing an untrained operator from mistaking the lead vehicle for the high-speed offender. However, this safeguard places the law enforcement official at a definite disadvantage, particularly in the apprehension of habitual violators.

As is well-known, the habitual violator may equip his vehicle with a radar receiver to monitor the police radar frequencies and permit the motorist to slow down in time to reduce the chance of apprehension. Upon receiving the signal from the police radar, the offending motorist, either with the aid of a radar detector or by visually sighting the patrol car, will reduce his speed to avoid apprehension while the patrolman is effecting a visual identification of the lead vehicle to which the radar has responded and read.

It is, therefore, the primary object of the present invention to provide a radar apparatus and accompanying method whereby the operator, by relying on radar identification augmented by his own judgment, may overcome the limitations discussed above and identify a speeding vehicle other than the lead vehicle of oncoming traffic.

As a corollary to the foregoing object, it is also an important aim of this invention to provide such a radar apparatus and method which may be employed in other applications where it is desired to determine the relative positions of moving targets of different speeds.

Another important object of the present invention is to provide a radar apparatus and accompanying method for discovering a high-speed target in the view of the radar, which target may be one of several targets of different speeds at various distances from the radar antenna.

Still another important object of this invention is to provide a radar as aforesaid that, having discovered the desired target, is capable of locking onto it to the exclusion of other targets and tracking the acquired target even though its speed decreases.

Still another important object of this invention is to provide a radar apparatus and method as aforesaid which, in a specific embodiment, identifies the target of interest at a particular visual reference known to the operator.

More particularly, it is an important object of this invention to effect the aforesaid identification by providing a receiving antenna system having diverging but overlapping radiation patterns, wherein a reference boresight is defined in the overlapped patterns for sighting, and thereby identifying, a target of interest at the time it intersects the reference boresight.

Yet another important object of the present invention is to provide a radar apparatus and accompanying method in which a receiving antenna system is employed having two diverging but overlapping radiation patterns, and in which a radar return signal from a target of interest is received in response to each individual pattern to provide a Doppler signal having an amplitude proportional to the relative power density of that pattern, whereby the amplitude interrelationship of the two Doppler signals derived from the respective patterns indicates the position of the target therein.

Furthermore, it is an important object of this invention to provide a controllable signal filter for the aforesaid radar which can be high-speed loaded so as to attenuate lower speed targets that would otherwise interfere.

It is an also an objective of this invention to accomplish the objects set forth above with apparatus that incorporates safeguards against an invalid identification or reading.

DESCRIPTION OF THE DRAWINGS

FIG. 2 is an illustration of the antenna geometry as seen in a horizontal plane and identifies the antenna boresights and the reference boresight.

FIG. 3 illustrates the diverging, overlapped, horizontal-plane radiation patterns of the two antennas A and B.

FIG. 4 is a graph showing typical relative power density radiation patterns (normalized) of antennas A and B.

FIG. 5 is a simplified schematic representation of the antenna system showing a dual antenna microwave head that employs horn antennas with turnstile junction polarization duplexing.

FIG. 6 shows the ratio $$\frac{P_{A(\theta)} - P_{B(\theta)}}{P_{A(\theta)} + P_{B(\theta)}}$$

Figure 1:
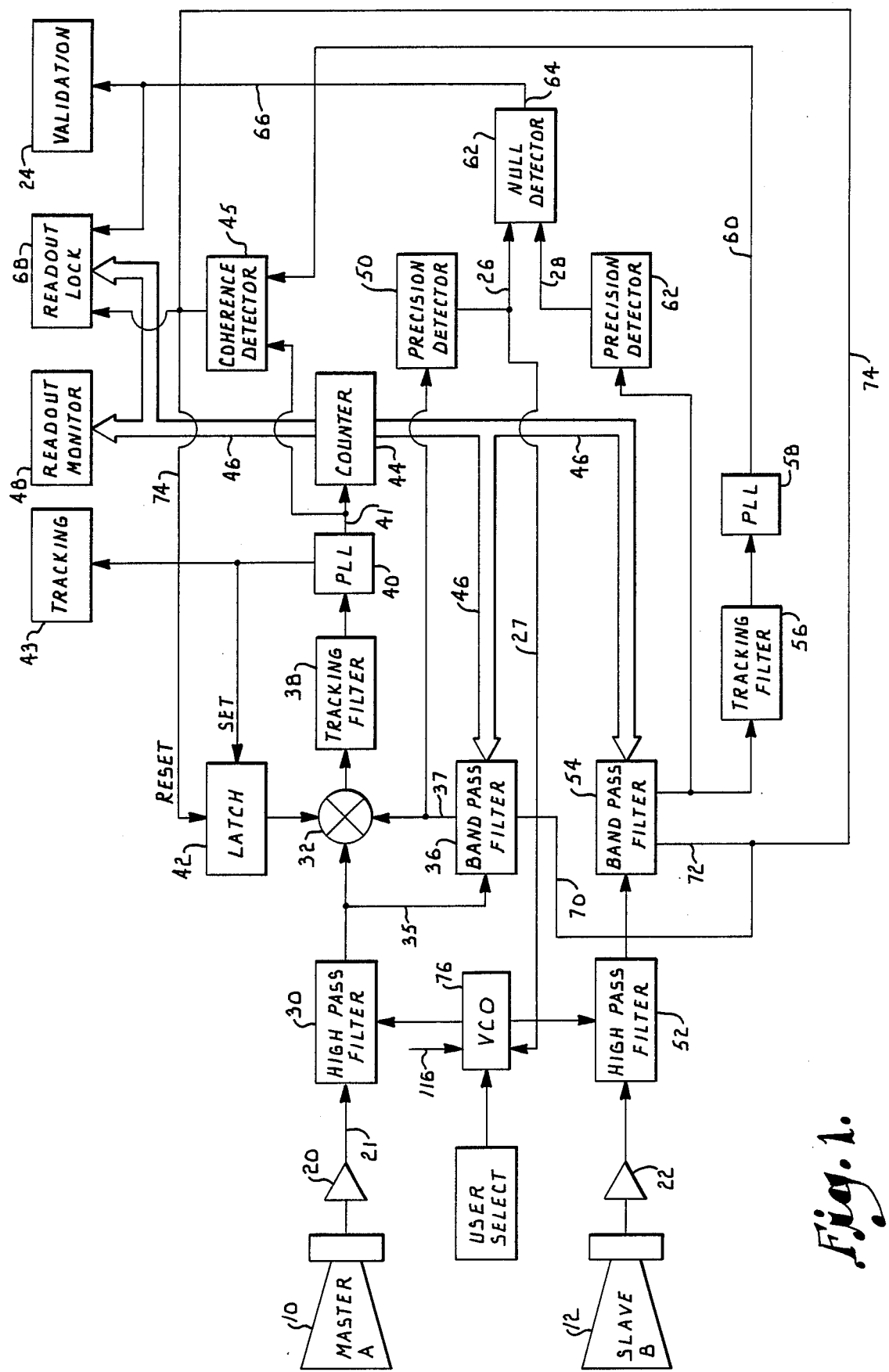
FIG. 1 is a block diagram of a traffic radar unit employing the improvements of the present invention in the receiver thereof.

for the radiation patterns of FIG. 4.

FIG. 7 is a block and logic diagram of the tracking filter employed in each channel.

FIG. 8 is a block diagram showing the filter sections the bandpass filter employed in each channel.

FIG. 9 is a block diagram illustrating a modification of FIG. 1 to enable selection of either moving or stationary radar operation.

FIG. 10 illustrates the response characteristic of the high pass filter employed in each channel and the upward shifting of the response curve in response to output amplitude.

THE ANTENNA SYSTEM

The illustrated embodiment uses two antennas arranged with diverging boresights as shown in FIG. 2. The boresight of antenna "A" is at an angle $\phi$ with respect to a main or reference boresight. Antenna "B" is at an angle $-\phi$ with respect to the reference boresight. Typical relative power density radiation patterns of antenna "A" and antenna "B" are shown in FIG. 4.

FIG. 5 shows a microwave head incorporating antennas "A" and "B" in the form of horn antennas 10 and 12 respectively with turnstile junction polarization duplexing. A single Gunn oscillator transmitter 14 feeds both antennas in phase. Alternatively, a separate transmitting antenna (not shown) could be employed and would be aligned with the reference boresight. Detector diodes 16 and 18 in each receiver arm mix the return signal with a portion of the transmitted signal in a homodyne detection technique. The result is an audio Doppler signal in each arm (amplified at 20 and 22 respectively) whose frequency is proportional to target velocity and whose voltage amplitude is proportional to the amplitude of the return microwave power. This microwave power to Doppler voltage relationship is maintained over the dynamic range in which the diode detector exhibits its square law characteristic. Thus, the Doppler signals from channel "A" and channel "B" can be expressed as follows:

$$DA = KA(\theta) \cos \omega t$$

$$DB = KB(\theta) \cos (\omega t - \alpha)$$

where $\alpha$ is the phase shift between the two antennas. The factor K is a function of range and target radar cross-section. $A(\theta)$ and $B(\theta)$ are functions of only their respective relative antenna patterns. The value of K is at any instant of time the same for both antennas.

Considering a single target at an angle $\theta$ with respect to the reference boresight, the Doppler signals after rectification are d.c. voltages proportional to KA and KB respectively. $A(\theta)$ and $B(\theta)$ are proportional to the relative power density radiation patterns of antenna "A" and antenna "B" respectively. Thus, $$\frac{KA(\theta) - KB(\theta)}{KA(\theta) + KB(\theta)} = \frac{A(\theta) - B(\theta)}{A(\theta) + B(\theta)} = \frac{P_{A(\theta)} - P_{B(\theta)}}{P_{A(\theta)} + P_{B(\theta)}}$$

where P is power. While the voltages KA and KB are dependent in range, target radar cross-section and antenna patterns, the voltage ratio $$\frac{KA(\theta) - KB(\theta)}{KA(\theta) + KB(\theta)} = \frac{A(\theta) - B(\theta)}{A(\theta) + B(\theta)}$$

is dependent only on the radiation patterns.

FIG. 6 shows the ratio $$\frac{P_{A(\theta)} - P_{B(\theta)}}{P_{A(\theta)} + P_{B(\theta)}}$$

for the patterns of FIG. 4. The d.c. voltage $$\frac{A - B}{A + B}$$

will have this same characteristic. Thus it is possible from the measured value of $$\frac{A - B}{A + B}$$

to determine the angle $\theta$, the angle between the reference boresight and the radial from the radar to the target. If there are two or more targets at different speeds in view of the radar, their Doppler signals may be isolated in separate bandpass filters in the radar receiver and the computation $$\frac{A - B}{A + B}$$

made for each Doppler signal pair. By locating antennas "A" and "B" on the right side of a roadway facing oncoming traffic, it may be appreciated from FIG. 6 that the results will identify the relative positions of the lead and following target vehicles of a line of traffic, i.e., the lead target will be to the left of following targets. When A=B, the target will of course be on the reference boresight, a special condition which is utilized in the preferred embodiment of a traffic radar unit (shown in FIG. 1) to provide positive visual identification of a target vehicle of interest which is being tracked by the radar.

Referring to FIG. 1, the radar receiver there illustrated has two channels corresponding to antennas "A" and "B", denoted the "master" and the "slave" antennas respectively. As will be described in detail hereinbelow, a validation light 24 is energized (and an audible tone is produced) when the d.c. voltages in the channel output lines 26 and 28 (A and B) are equal in amplitude. The energization of the validation light 24 signals the operator that the vehicle that can be seen in alignment with the reference boresight is, in fact, the target vehicle upon which the radar is locked. Typically, the dual antenna microwave head schematically illustrated in FIG. 5 would be mounted on the hood or dashboard of the patrol vehicle and oriented such that the reference boresight extends generally along, but at a slight angle to, the roadway under surveillance. The present invention, therefore, would be employed in the same manner as conventional, single antenna radars except that the reference boresight, instead of either of the antenna boresights, would be aimed directly at the target area. Accordingly, in the typical enforcement application where the radar unit is located in or adjacent to one lane of a highway with the antenna system facing oncoming traffic in the opposite lane, it may be appreciated that the master antenna "A" will acquire a distant target first, followed by the slave antenna "B", and that the target will be identified by the operator when it intersects the reference boresight in the region of the overlapped radiation patterns seen in FIGS. 3 and 4. FIG. 6 shows that the condition at which the voltages A and B are equal must occur when the angle θ is zero, corresponding to a target position directly on the reference boresight.

THE RADAR RECEIVER

A block diagram of a Doppler radar receiver for use in stationary radar traffic control applications is shown in FIG. 1 and employs master and slave signal processing channels corresponding to the master and slave antennas discussed above. Referring initially to the master antenna A, the Doppler signal from amplifier 20 is delivered along a lead 21 to a high pass filter 30 whose output is connected to a FET gate 32 and via a lead 35 to the input of a digitally tuned bandpass filter 36. The output of the gate 32 is connected to the input of a tracking filter 38 which, in addition to the usual tracking function, processes the incoming sinusoidal Doppler signal to provide a logic conditioned (square wave) speed signal at its output which is delivered to an integrated circuit 40 that functions as a digital phase-locked loop for validation purposes. Verification of a valid signal sets a latch 42, energizes an indicator lamp 43 on the control panel of the radar unit to inform the operator that the radar is tracking, and delivers the square wave speed signal along a lead 41 to a digital counter 44 and one input of a coherence detector 45. The setting of latch 42 causes gate 32 to interpose the bandpass filter 36 in series between the high pass filter 30 and the tracking filter 38, the purpose being to prevent the tracking filter 38 from unlocking. Accordingly, the tracking filter 38 is forced to track the output of bandpass filter 36 which, as will be discussed, will not change from a digitally set center frequency.

The output of the counter 44 is communicated by a digital bus 46 to the bandpass filter 36 to center the passband thereof on the incoming Doppler signal, and to a readout monitor 48 that continually indicates to the operator the speed of the tracked vehicle. The first acquired speed is held and displayed in a window identified "readout lock" 68. In addition to being connected to the input of the tracking filter 38, the output of the bandpass filter 36 on lead 37 is also fed to the input of a precision detector 50 where the sinusoidal signal is subjected to fullwave rectification and integration to provide the d.c. output signal of the master antenna channel at line 26.

The slave antenna channel contains components identical to the master channel just described. The sinusoidal Doppler signal from amplifier 22 is fed to the input of a high pass filter 52 connected, in turn, to a digitally tuned bandpass filter 54 whose center frequency is likewise set by the counter 44 via digital bus 46. The output of bandpass filter 54 is fed to a tracking filter 56 corresponding to the tracking filter 38 in the master channel, and thence to a phase-locked loop 58 corresponding to PLL 40 in the master channel. A lead 60 extends from the output of PLL 58 to a second input of the coherence detector 45. The output of bandpass filter 54 is also rectified and integrated by a precision detector 62 and the d.c. signal thus provided constitutes the output of the slave antenna channel appearing on line 28. Alternatively, to save components and eliminate the need to provide identical tracking filters 38 and 56, a single tracking filter may be utilized by both the master and slave channels through a time-sharing arrangement executed by FET analog switching (not shown).

The output signals from the respective channels are inputted to a null detector 62 which delivers an identification signal at its output 64 when the d.c. signals on lines 26 and 28 are of equal amplitude. A lead 66 connects detector output 64 to the validation indicator lamp 24 and the target speed readout 68 which is now locked at the first acquisition speed of the target vehicle previously held. This lock is effected at the time the target vehicle intersects the reference boresight. The digital bus 46 extends to the readout lock 68 along with the output of the coherence detector 45.

A second output from each of the bandpass filters 36 and 54 serves to safeguard the system against an interfering signal that is very close in frequency to the return Doppler signal of the target being tracked. Such outputs are represented by leads 70 and 72 from bandpass filters 36 and 54 respectively, and they extend as a common lead 74 to the reset input of latch 42. The output of the coherence detector 45 is also connected to the latch reset via lead 74.

Referring to the input circuitry preceding the tracking filters, the beginning of the passband of each of the high pass filters 30 and 52 in the master and slave channels is set by a voltage-controlled oscillator 76 whose output corresponds to an anticipated violation speed selected by the operator. This function is indicated by the block "user select" and is typically embodied in a manually operated dial calibrated in miles-per-hour and set by the operator at the minimum violation speed to which the radar is to respond.

The voltage-controlled oscillator 76 is also responsive to the d.c. voltage level on a control lead 27 in order to shift the passbands of the filters 30 and 52 and increase the attenuation of lower speed, undesired targets. The control lead 27 is connected to output line 26 and thus the master channel output is inputted to the voltage-controlled oscillator 76 to cause its output frequency to follow the amplitude of the output of the precision detector 50. As the closing distance to the tracked target decreases, such amplitude increases and thus the VCO output increases in frequency to shift the passbands of the filters 30 and 52 higher, thereby attenuating a stronger, lower frequency interfering signal as illustrated in FIG. 10.

The tracking filters 38 and 56 employed in the present invention utilize the same circuit configuration as shown in detail in FIG. 7. The input Doppler signal is received by an automatic gain control circuit 80 whose output, in phase with the input, is fed to a bandpass filter 82 and a phase shifter 84. The signal is shifted in phase by 270°, formed into a square wave by a comparator 86, and delivered to one input of an exclusive OR gate 88. The output 83 of the bandpass filter 82, shifted in phase by 180°, is first applied to a comparator 85 and then to the other input of the exclusive OR gate 88 and provides the square wave output signal illustrated at 90. It should be understood that the comparator 85 constitutes wave shaping circuitry for converting the sinusoidal input to the logic conditioned (square wave) signal 90 of constant amplitude.

The output of the exclusive OR gate 88 is fed to an integrator 92 which delivers a d.c. error voltage via lead 94 to the bandpass filter 82 to change the RC time constant of the filter as necessary. The output signal 90 shows that the filter circuitry is locked when signal 90 is of stable frequency, i.e., constant and of the same frequency as the incoming Doppler signal.

Referring to FIG. 8, an example of a means of safeguarding the system against an invalid identification is shown. The filter sections of the bandpass filter 36 are there illustrated, it being understood that the components of the bandpass filter 54 in the slave channel are identical thereto. Three bandpass filter sections 96, 98 and 100 are employed and are identical except for their peak amplitude frequencies. The filter section 100 is centered on the audio Doppler frequency corresponding to the target vehicle which is being monitored, whereas the filter sections 96 and 98 are upper and lower guard filters having amplitude peaks slightly above and slightly below the center frequency. It should be understood that each of the bandpass filter sections has a very narrow pass band with steep skirts and thus the differential in terms of miles-per-hour of target speed would typically be on the order of one-tenth of a mile-per-hour. For example, with the center frequency of the channel at 70 miles-per-hour, the upper and lower guard filter sections 96 and 98 would have amplitude peaks at 69.9 and 70.1 miles-per-hour respectively.

The center frequency filter 100 provides the output along lead 37 to the main tracking filter 38 (FIG. 1). The outputs of all of the filter sections are fed to comparator circuitry 102 which executes an AND function if signals from filter section 100 and either one (or both) of the guard filters 96 and 98 are simultaneously received, thereby resetting the latch 42 (FIG. 1) and returning the radar to the search mode.

FIG. 9 illustrates a modification to the receiver system of FIG. 1 to permit the traffic radar unit to operate in either stationary or moving target radar applications. As is well known, in a moving traffic radar it is necessary to subtract the speed of the moving patrol car from the closing speed in order to determine the actual speed of the target vehicle. The output 21 from amplifier 20 in the master channel remains connected as shown in FIG. 1 but is also connected as in FIG. 9 to a low pass filter 104 which passes only the relatively slow speed signal produced by the moving patrol car. Such speed signal is then fed to the validation circuitry 106 of the patrol channel which includes the usual AGC, analog tracking filter, and digital PLL for validation. The square wave output signal from validation circuitry 106 is inputted to a subtractor 108 which is interposed in lead 41 extending from the output of PLL 40. Accordingly, the subtractor 108 also receives the speed signal representing the closing speed of the vehicles and produces a difference signal at its output which is the actual target speed. To revert to stationary radar use, a FET switch 110 is operated as schematically illustrated by a lead 112 which would be connected to a moving/ stationary switch under the control of the operator. When the FET circuit is closed, lead 41 is shunted around the subtractor 108 and the circuit is in the condition as illustrated in FIG. 1 where the output of PLL 40 is fed directly to the counter 44. In order to maintain the passbands of the high pass filters 30 and 52 in the master and slave channels above the speed of the patrol car, the output from the validation circuitry 106 is also fed to a detector 114 which produces a d.c. output level along a lead 116 that is connected to a control input of the voltage-controlled oscillator 76 (FIG. 1).

OPERATION

In searching mode, the composite Doppler signal from the master antenna 10 is passed by the high pass filter 30 and the gate 32 and is fed to the tracking filter 38. At this time the slave channel is effectively not in the system. In moving radar applications, the tracking filter 38 typically searches downward from 210 miles-per-hour (closing speed) and by the action of its internal phase locked loop it will lock onto a valid received signal, i.e., a signal of sufficient strength to be above the noise level.

The operator selects a violation speed and the beginning of the pass band of the high pass filter 30 is correspondingly set by the voltage-controlled oscillator 76. As an example, for highway use, the operator could select 65 miles-per-hour as the speed above which he wishes the radar to be responsive.

Assuming under the above conditions that a 70 miles-per-hour Doppler signal is received, the tracking filter 38 in the master channel responds and locks on. This places the 70 m.p.h. signal at the peak or maximum amplitude point of the tracking filter passband. This is accomplished as illustrated in FIG. 7 and described above by the action of the d.c. error voltage in the internal phase-locked loop of the tracking filter. The 70 m.p.h. speed signal is thus delivered to the PLL 40 for validation and then via lead 41 to the counter 44 which generates a digital count of 70 on the bus 46. Accordingly, the center frequencies of the master and slave bandpass filters 36 and 54 are also set at 70 miles-per-hour. The latch 42 is set to operate gate 32 and now route the incoming Doppler signal in the master channel through the bandpass filter 36. Both the master and the slave channels are now in operation in the tracking mode.

Assuming that there are number of target vehicles within the range of the radar, it is now necessary to identify the vehicle traveling at 70 miles-per-hour and, if that vehicle is not the lead vehicle, it is necessary to prevent the strong return signals from closer vehicles from interfering with the capability of the instant invention to look past the closest vehicle and identify a trailing violator. This is the function of the passband control lead 27. The output of the precision detector 50 is the Doppler signal being tracked in the master channel converted by the detector 50 to a d.c. signal having an amplitude proportional to the amplitude of the tracked signal. Therefore, the stronger the return signal, the greater the amplitude of the d.c. output from the detector 50 which is fed to the voltage-controlled oscillator 76 to, in turn, cause the high pass filter 30 to undergo an upward shift in its passband. This is illustrated in FIG. 10 by a comparison of the solid line characteristic curve 120 with the frequency shifted, broken line curve 122. If it were not for the action of this passband control, the passband characteristic of filter 30 would remain as illustrated at 120; however, the moving filter or high-speed loading effect of the present invention causes the passband to shift as illustrated at 122 and thereby severely attenuate any signals from other vehicles traveling at less than 70 miles-per-hour. An identical passband shift occurs in the high pass filter 52 of the slave channel. It should be understood that due to the $1/r^4$ effect, a signal from a closer vehicle will be of much greater amplitude unless, as illustrated in FIG. 10, it is severely attenuated by the high pass filters 30 and 52 as accomplished in the instant invention. Furthermore, since a violator may slow down after the first acquisition, this feature is particularly important as it permits the skirt of the passband to be shifted upwardly to improve the discrimination against return signals from other vehicles that become less separated in frequency from the violator's return signal.

For purposes of illustration, the Doppler frequency in K-band traffic radar is found by multiplying the speed of the target vehicle in miles-per-hour by 72.023. For the lower frequency X-band, the factor is 31.389. Thus, in the X-band a signal returned from a target moving at 70 miles-per-hour has a Doppler frequency of approximately 2,197 Hertz.

The sole function of the slave channel is to follow the master channel and then provide a means by which the operator knows that the amplitudes of the received signals in antenna A and antenna B are equal. The precision detectors 50 and 62 are full-wave rectifiers capable of monitoring signals in the millivolt range. Their outputs on lines 26 and 28 are fed to the null detector 62 which may comprise a voltage comparator that delivers an output when its two inputs are equal. When the target vehicle being tracked crosses the reference boresight (FIGS. 2-5), the null detector 62 delivers an identification signal in the form of an output pulse along lead 66 which excites, and causes to latch up, the validation indicator 24 and its attendant audio signal. Preferably, the indicator 24 would include a light on the reference boresight or visible when looking along it so that the patrolman, while sighting, knows the exact time that he will see the violator crossing the reference boresight.

Note that if at any time there is a lack of coherence of the master and slave channels, the coherence detector 45 releases the readout lock 68 and resets the latch 42 to cause the radar to return to the search mode. Also, a further safeguard is provided by the guard filter sections illustrated in FIG. 8 as the latch 42 is also reset if a second signal is present that is too near in frequency to the acquired target to assure a valid reading. Therefore, the instant invention determines the relative position of one moving target among a number of moving targets of different speeds and enables the tracked target to be positively identified, but the tracking mode is aborted if two targets approach the same speed prior to positive identification to prevent possible confusion and invalid identification.

Having thus described the invention, what is claimed as new and desired to be secured by Letters Patent is:

1. In a Doppler traffic radar, a method of producing signal information in the radar receiver indicative of the relative position of one of a plurality of spaced-apart targets moving at different speeds, said method comprising the steps of:
    (a) providing an antenna having first and second relative power density radiation patterns which diverge from each other at an angle selected to cause the patterns to overlap in a predetermined interrelationship;
    (b) transmitting radio frequency energy in a manner to cause simultaneous presence in said patterns of transmitted energy of the same frequency;
    (c) receiving a return signal from said one target in response to said first pattern and providing therefrom a first Doppler signal having an amplitude proportional to the relative power density characteristic of said first pattern;
    (d) receiving said return signal from said one target in response to said second pattern and providing therefrom a second Doppler signal having the same frequency as said first Doppler signal and having an amplitude proportional to the relative power density characteristic of said second pattern; and
    (e) detecting the amplitudes of said first and second Doppler signals, whereby their amplitude relationship indicates the position of said one target in the overlapped radiation patterns.

2. The method as claimed in claim 1, wherein said step (a) includes providing said antenna with first and second closely spaced antenna elements having said first and second radiation patterns respectively.

3. The method as claimed in claim 2, wherein said step (a) further includes orienting said antenna elements with their respective boresights diverging from each other at said angle.

4. The method as claimed in claim 1, further comprising the steps of:
    (f) establishing a reference boresight in the overlapped patterns; and
    (g) determining the time at which the amplitudes of said first and second Doppler signals bear a predetermined relationship to each other corresponding to a target position along said reference boresight.

5. In a Doppler traffic radar, a method of identifying a moving target at the time it intersects a reference boresight, said method comprising the steps of:
    (a) providing first and second closely spaced antenna elements with their respective boresights diverging from each other and each defining a predetermined angle with respect to said reference boresight;
    (b) simultaenously exciting said antenna elements with radio frequency energy of the same frequency;
    (c) detecting a return signal from said target received by each antenna element to provide first and second Doppler signals of the same frequency derived from said first and second antenna elements respectively, each of said Doppler signals having an amplitude proportional to the relative power density radiation pattern of the corresponding antenna element; and
    (d) detecting the time at which the amplitudes of said first and second Doppler signals bear a predetermined relationship to each other corresponding to a target position along said reference boresight.

6. The method as claimed in claim 5, wherein said step (a) includes orienting said antenna elements with their radiation patterns overlapped in a predetermined interrelationship, and establishing said reference boresight in the overlapped patterns.

7. The method as claimed in claim 5, wherein said step (a) includes orienting said antenna elements with their respective boresights disposed on opposite sides of said reference boresight.

8. The method as claimed in claim 5, wherein said step (a) includes orienting said antenna elements with their respective boresights disposed on opposite sides of said reference boresight, said predetermined angles being equal, and wherein said step (c) is accomplished by detecting the time at which the amplitudes of said first and second Doppler signals are equal.

9. In a traffic radar:
    master antenna means having a first predetermined relative power density radiation pattern;
    slave antenna means having a second predetermined relative power density radiation pattern overlapping said first pattern and establishing a reference boresight in the overlapped patterns;
    means for causing simultaneous presence in said patterns of transmitted radio frequency energy of the same frequency;
    a master signal processing channel connected to said master antenna means and including means for deriving a first Doppler signal from an incoming return signal, means for tracking said first Doppler signal, and output means for providing a first output signal representative of its amplitude;

a slave signal processing channel connected to said slave antenna means and including means fo deriving a second Doppler signal from said incoming return signal having the same frequency as said first Doppler signal, means for tracking said second Doppler signal, and output means for providing a second output signal representative of the amplitude of said second Doppler signal; and means responsive to said first and second output signals for determining when the amplitudes of said first and second Doppler signals bear a predetermined relationship to each other corresponding to a target position along said reference boresight.

10. Apparatus as claimed in claim 9, wherein said tracking means of each channel includes a controllable high pass filter through which incoming, Doppler-frequency signals are conducted or attenuated, there being control means coupled with said filters and responsive to increasing signal amplitude in one of said channels for shifting the passbands of said filters upward in frequency, whereby to attenuate stronger, lower frequency interfering signals.

11. Apparatus as claimed in claim 9, wherein said tracking means of each channel includes a controllable high pass filter through which incoming, Doppler-frequency signals are conducted or attenuated, and wherein said master signal processing channel further includes voltage-responsive control means coupled with said high pass filters and responsive to said first output signal for shifting the passbands of said filters upward in frequency as said first Doppler signal increases in amplitude, whereby to attenuate stronger, lower frequency interfering signals.

12. Apparatus as claimed in claim 9, wherein the tracking means in each of said signal processing channels includes a controllable bandpass filter, there being control means coupled with said bandpass filters and responsive to the output of the master channel tracking means for centering the passbands of the filters on the respective Doppler signals.

13. Apparatus as claimed in claim 9, wherein the tracking means in each of said signal processing channels includes a digitally controllable bandpass filter, there being counter means coupled with said bandpass filters and responsive to the output of the master channel tracking means for centering the passbands of the filters on the respective Doppler signals.

14. Apparatus as claimed in claim 9, wherein said master channel has search and track operational modes and further includes frequency-responsive means in the track mode for sensing the presence of an interfering Doppler signal near the frequency of said first Doppler signal and returning the master channel to the search mode.

15. Apparatus as claimed in claim 9, wherein said master channel has search and track operational modes, and wherein the tracking means of at least one of said channels includes a bandpass filter having a center-frequency filter section for passing the Doppler signal being tracked, upper and lower guard filter sections for sensing the presence of an interfering Doppler signal either above or below the tracked signal respectively, and control means responsive to outputs from said center-frequency section and either or both of said guard sections for returning the master channel to the search mode.

* * * * *

UNITED STATES PATENT AND TRADEMARK OFFICE
CERTIFICATE OF CORRECTION

PATENT NO. : 4,743,908
DATED : May 10, 1988
INVENTOR(S) : JOHN R. BRASSFIELD, ET AL

It is certified that error appears in the above—identified patent and that said Letters Patent is hereby corrected as shown below:

Claim 9, column 11, line 6, delete "fo" and substitute --for--.

Signed and Sealed this

Seventeenth Day of January, 1989

Attest:

DONALD J. QUIGG

Attesting Officer

Commissioner of Patents and Trademarks